F. V. CARMAN.
CAR MOVER.
APPLICATION FILED OCT. 26, 1921.
1,408,561.
Patented Mar. 7, 1922.
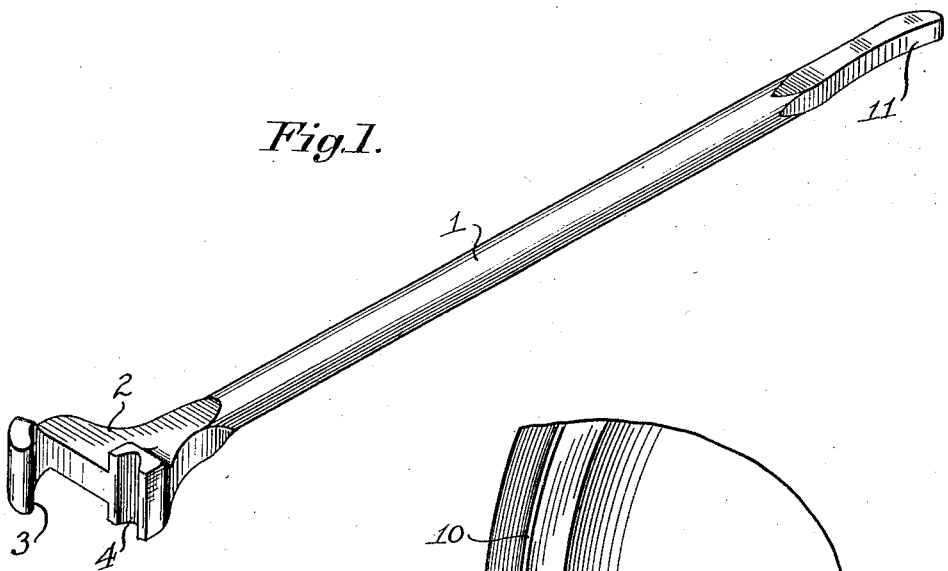
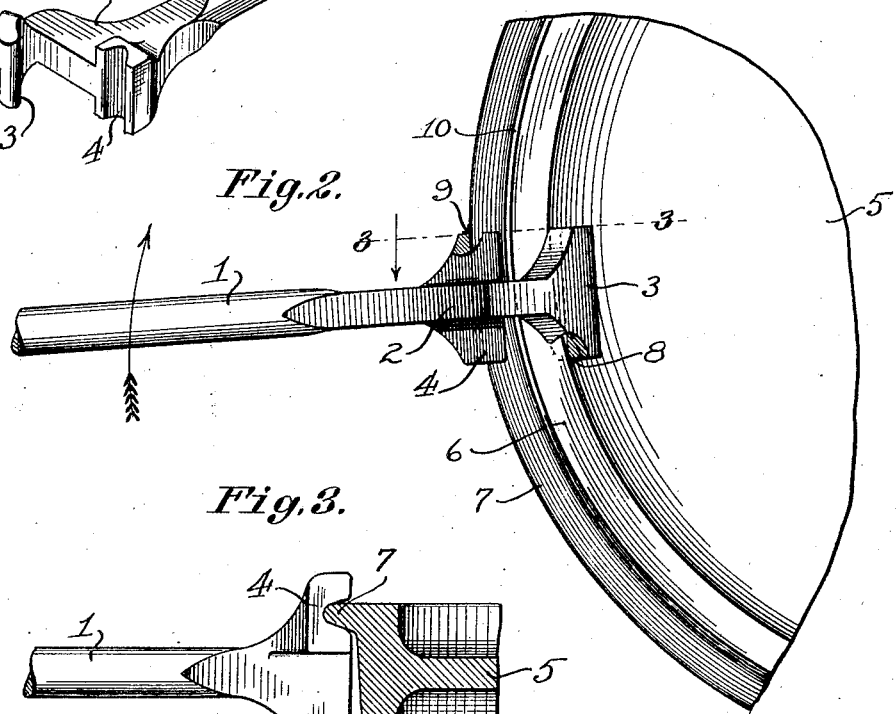
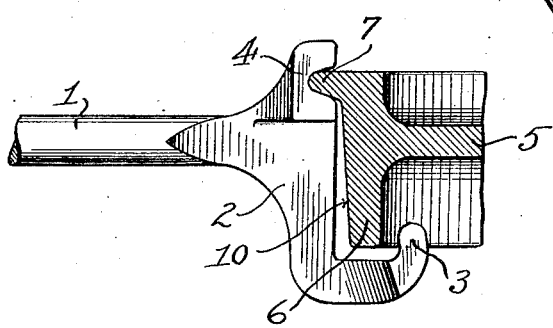
Inventor.
Frank V. Carman
By Booth & Booth,
Attorneys.

UNITED STATES PATENT OFFICE.

FRANK V. CARMAN, OF OAKLAND, CALIFORNIA.

CAR MOVER.

1,408,561. Specification of Letters Patent. Patented Mar. 7, 1922.

Application filed October 26, 1921. Serial No. 510,465.

*To all whom it may concern:*

Be it known that I, FRANK V. CARMAN, a citizen of the United States, residing at Oakland, in the county of Alameda and State of California, have invented certain new and useful Improvements in Car Movers, of which the following is a specification.

My invention relates to devices for moving railway cars by hand.

The object of my invention is to provide a simple and easily handled device, tool or implement, by means of which one or two men can move a car for short distances, as is frequently necessary during the loading and unloading of freight cars on spur tracks or at way-stations where locomotive or other power is not available. Such moving of freight cars is usually done by means of a pinch bar placed upon the rail under one of the car wheels, but this is extremely slow and laborious.

My car mover comprises, essentially, a bar having a head adapted to releasably grip the rim of a car-wheel. It is light and inexpensive, and has no moving parts. It can be instantly attached to or detached from the car wheel, and, when so attached, provides sufficient leverage so that one man can easily move an empty freight car, and two men can move a loaded car. Moreover, it will not slip when under strain, so that there is no danger of injury to the user.

A complete description of my invention will now be given, with reference to the accompanying drawings, wherein—

Fig. 1 is a perspective view of my car mover.

Fig. 2 is a part sectional side elevation showing my device as applied to a car-wheel.

Fig. 3 is a section taken in the direction of the arrow on the line 3—3 of Fig. 2.

In the drawings, the reference numeral 1 designates the shank, stock or handle of my car mover, which is preferably formed of iron or steel, and is about the diameter and length of an ordinary crow-bar. At one end of this shank is a gripping head 2, which has a relatively wide offset hook 3 upon one side, and an offset grooved portion 4 upon the other side of approximately the same width as the hook 3.

In applying the device to the car wheel, a portion of which is shown in Figs. 2 and 3 at 5, the hook 3 engages the inside of the wheel rim 6, and the groove 4 fits over and bears against the flange 7. When pressure is applied to the handle 1, either upwardly or downwardly, the head 2 grips the wheel rim firmly, without slipping. When such pressure is applied upwardly, as shown in Fig. 2, the lower end of the hook 3 bears against the inside of the rim 6, as shown at 8, and the upper end of the groove 4 cramps against the flange 7, as shown at 9. The device is entirely free from the outside or tread 10 of the wheel rim, as shown in Fig. 3, so that there is no danger of nicking or marring said tread.

To apply the device, it is only necessary to engage the hook 3 inside the wheel rim 6 and then swing the handle 1 inwardly, in a horizontal direction, until the groove 4 comes into engagement with and cramps on the wheel flange 7. After moving the wheel as far as the length of the handle 1 will permit, a slight lateral movement of said handle, in an outward direction, will free the head from the wheel sufficiently to enable it to be shifted to a new position.

The shank 1 is provided with a blade 11 upon the end opposite to the head 2. Said blade 11 is similar to that of the ordinary pinch bar, and may be used under the wheel in the usual manner, if the presence of outside brake shoes or other devices prevents the gripping of the wheel by the head 2.

I claim:—

1. A car-mover comprising a shank, and a head having a hook adapted to engage the inner periphery of the rim and a grooved portion adapted to cramp upon the wheel flange, said hook and grooved portion holding the head free of the wheel tread.

2. A car-mover comprising a shank having a head with portions adapted to grip the car wheel by engaging the inner periphery of the wheel rim and the outer periphery of the wheel flange, said portions holding the head free of the wheel tread.

3. A car-mover comprising a shank, and a head having a laterally offset hook adapted to engage the inner periphery of the rim, and a portion offset in the opposite direction and adapted to cramp on the wheel flange, whereby the wheel rim is gripped between said offset portions.

4. A car-mover comprising a shank having a head in line with the shank and provided with laterally offset opposite portions extending on each side of the plane of the shank and adapted to cramp upon opposite sides of the rim of a car wheel, and to hold the head free of the wheel tread.

In testimony whereof I have signed my name to this specification.

FRANK V. CARMAN.